United States Patent
Oguchi

(10) Patent No.: US 7,580,793 B2
(45) Date of Patent: Aug. 25, 2009

(54) ON-VEHICLE INFORMATION TERMINAL, NAVIGATION SYSTEM, ON-VEHICLE INFORMATION TERMINAL CONTROL METHOD AND PROGRAM PRODUCT

(75) Inventor: Junko Oguchi, Zama (JP)

(73) Assignee: Xanavi Informatics Corporation, Zama-shi (JP)

( * ) Notice: Subject to any disclaimer, the term of this patent is extended or adjusted under 35 U.S.C. 154(b) by 503 days.

(21) Appl. No.: 11/391,181

(22) Filed: Mar. 29, 2006

(65) Prior Publication Data

US 2006/0224314 A1    Oct. 5, 2006

(30) Foreign Application Priority Data

Mar. 29, 2005    (JP)    ............................. 2005-093907

(51) Int. Cl.
G01C 21/00    (2006.01)

(52) U.S. Cl. ...................................... 701/209; 340/990

(58) Field of Classification Search ................. 701/209, 701/200, 210, 211, 201; 340/990, 995.1; 707/10, 100; 717/144–146, 155–157
See application file for complete search history.

(56) References Cited

U.S. PATENT DOCUMENTS

| | | | | |
|---|---|---|---|---|
| 5,821,880 A | * | 10/1998 | Morimoto et al. | 340/995.21 |
| 6,415,224 B1 | * | 7/2002 | Wako et al. | 701/208 |
| 6,807,480 B1 | * | 10/2004 | Iwasaki et al. | 701/209 |
| 2004/0267443 A1 | * | 12/2004 | Watanabe | 701/201 |

FOREIGN PATENT DOCUMENTS

JP    2004-208196 A    7/2004

* cited by examiner

*Primary Examiner*—Dalena Tran
(74) *Attorney, Agent, or Firm*—Crowell & Moring LLP

(57) ABSTRACT

An on-vehicle information terminal includes a menu display control unit that displays at a display monitor a selection menu organized over a plurality of hierarchical levels, a selection unit that selects a specific menu item in each hierarchical level in the selection menu, a processing execution unit that executes processing corresponding to a menu item that is ultimately selected, a keyword setting unit that sets a search keyword based upon an input operation performed by the user, a search unit that searches for a menu item related to the search keyword having been set from among various menu items in the selection menu and an informing unit that informs the user of an operation procedure to be performed when the selection unit selects the searched menu item.

20 Claims, 8 Drawing Sheets

ON-VEHICLE INFORMATION TERMINAL, NAVIGATION SYSTEM, ON-VEHICLE INFORMATION TERMINAL CONTROL METHOD AND PROGRAM PRODUCT

INCORPORATION BY REFERENCE

The disclosure of the following priority application is herein incorporated by reference:

Japanese Patent Application No. 2005-93907 filed Mar. 29, 2005

BACKGROUND OF THE INVENTION

1. Field of the Invention

The present invention relates to a method for informing of operation procedures in an on-vehicle information system such as a navigation system.

2. Description of Related Art

The increasingly diverse functions made available in recent years to satisfy various user needs in electronic apparatuses such as navigation systems enable execution of different types of processing in response to user operations. At the same time, the user is bound to find it increasingly difficult to master the operation procedures, which become more complicated as more diverse types of processing become available. Accordingly, a number of methods have been proposed to enable execution of desired processing without requiring the user to memorize the operation procedure. For instance, Japanese Laid-open Patent Application Publication No. 2004-208196 discloses a method in which the user enters a search keyword that is part of the name of a specific function among various functions available in a terminal device such as a portable telephone, the corresponding function setting mode is searched in response and the operation shifts into the function setting mode. Through this method, the operation can enter the target function setting mode without requiring the user to memorize the operation procedure.

However, in the device disclosed in Japanese Laid-open Patent Application Publication No. 2004-208196, once a search keyword is entered, the operation immediately enters the corresponding function setting mode without allowing the user to learn the correct operation procedure. Thus, the user, without the opportunity to familiarize himself with the operation procedure for the particular processing, never learns it.

SUMMARY OF THE INVENTION

The on-vehicle information terminal according to the present invention, capable of executing various types of processing, comprises a menu display control unit that displays at a display monitor a selection menu organized over a plurality of hierarchical levels, a selection unit that selects in response to a user operation a specific menu item at each hierarchical level in the selection menu displayed at the display monitor by the menu display control unit, a processing execution unit that executes processing corresponding to a menu item that is ultimately selected by the selection unit, a keyword setting unit that sets a search keyword based upon an input operation performed by the user, a search unit that searches for a menu item related to the search keyword set by the keyword setting unit from among various menu items in the selection menu and an informing unit that informs the user of an operation procedure to be performed when the selection unit selects the menu item searched by the search unit.

The informing unit in the on-vehicle information terminal described above may inform the user of the operation procedure by successively displaying display contents corresponding to the individual hierarchical levels in the selection menu at the display monitor in conformance to the operation procedure.

Alternatively, the informing unit in the on-vehicle information terminal described above may inform the user of the operation procedure by displaying at the display monitor text information explaining the operation procedure.

As a further alternative, the informing unit in the on-vehicle information terminal described above may inform the user of the operation procedure by outputting audio information explaining the operation procedure.

In addition, the menu display control unit in the on-vehicle information terminal may control the display monitor to display icons constituted with, at least, graphics, characters or symbols and each assuming an unique appearance to a specific menu item in the selection menu. In this case, the informing unit may inform the user of the operation procedure by displaying at the display monitor the icons corresponding to the individual menu items that must be selected in various hierarchical levels until the searched menu item is ultimately selected, in an order matching the operation procedure.

As yet another alternative, the informing unit in the on-vehicle information terminal described above may inform the user of the operation procedure by displaying within a single screen page at the display monitor display contents corresponding to the individual hierarchical levels in the selection menu in an order matching the operation procedure.

The navigation system according to the present invention comprises the on-vehicle information terminal described above and a current position detection device that detects the current position of the subject vehicle.

Through the method for controlling an on-vehicle information terminal capable of executing various types of processing according to the present invention, a selection menu organized over a plurality of hierarchical levels is displayed at a display monitor, a specific menu item in each hierarchical level in the selection menu is selected in response to a user operation, processing corresponding to a menu item that is ultimately selected is executed, a search keyword is set based upon a user input operation, a menu item related to the search keyword having been set is searched from among various menu items in the selection menu and an operation procedure to be performed to select the searched menu item is indicated to the user.

In the on-vehicle information terminal control method, the operation procedure may be indicated to the user by successively displaying display contents corresponding to the individual hierarchical levels in the selection menu at the display monitor in an order matching the operation procedure.

Alternatively, the operation procedure may be indicated to the user by displaying at the display monitor text information explaining the operation procedure in the on-vehicle information terminal control method.

As a further alternative, the operation procedure may be indicated to the user by outputting audio information explaining the operation procedure in the on-vehicle information terminal control method.

In addition, in the on-vehicle information terminal control method described above, the display monitor may be controlled to display icons constituted with, at least, graphics, characters or symbols and each assuming an unique appearance corresponding to a specific menu item in the selection menu. In this case, the operation procedure may be indicated to the user by displaying at the display monitor the icons corresponding to the individual menu items that must be selected in various hierarchical levels until the searched menu item is ultimately selected, in an order matching the operation procedure.

As yet another alternative, in the on-vehicle information terminal control method described above, the operation procedure may be indicated to the user of the operation procedure by displaying within a single screen page at the display monitor display contents corresponding to the individual hierarchical levels in the selection menu in an order matching the operation procedure.

The program product to be used to control a computer capable of executing various types of processing according to the present invention enables the computer to execute a step for displaying at a display monitor a selection menu organized over a plurality of hierarchical levels, a step for selecting a specific menu item in each hierarchical level in the selection menu in response to a user operation, a step for executing processing corresponding to a menu item that is ultimately selected, a step for setting a search keyword based upon a user input operation, a step for searching for a menu item related to the search keyword having been set from among various menu items in the selection menu and a step for informing the user of an operation procedure to be performed to select the searched menu item.

The program product described above may control the computer in the step for informing the user of the operation procedure so as to successively display at the display monitor display contents corresponding to the individual hierarchical levels in the selection menu in an order matching the operation procedure.

Alternatively, the program product described above may control the computer in the step for informing the user of the operation procedure so as to display at the display monitor text information explaining the operation procedure.

As a further alternative, the program product may control the computer in the step for informing the user of the operation procedure so as to output audio information explaining the operation procedure.

As a still further alternative, the program product may control the computer in the step for displaying the selection menu at the display monitor so as to display icons constituted with, at least, graphics, characters or symbols and each assuming an unique appearance corresponding to a specific menu item in the selection menu, and may control the computer in the step for informing the user of the operation procedure so as to display at the display monitor the icons corresponding to the individual menu items that must be selected in the individual hierarchical levels until the searched menu item is ultimately selected, in an order matching the operation procedure.

As yet another alternative, the program product may control the computer in the step for informing the user of the operation procedure so as to display within a single screen at the display monitor display contents corresponding to various hierarchical levels in the selection menu in an order matching the operation procedure.

DETAILED DESCRIPTION OF PREFERRED EMBODIMENTS

First Embodiment

Figure 1:
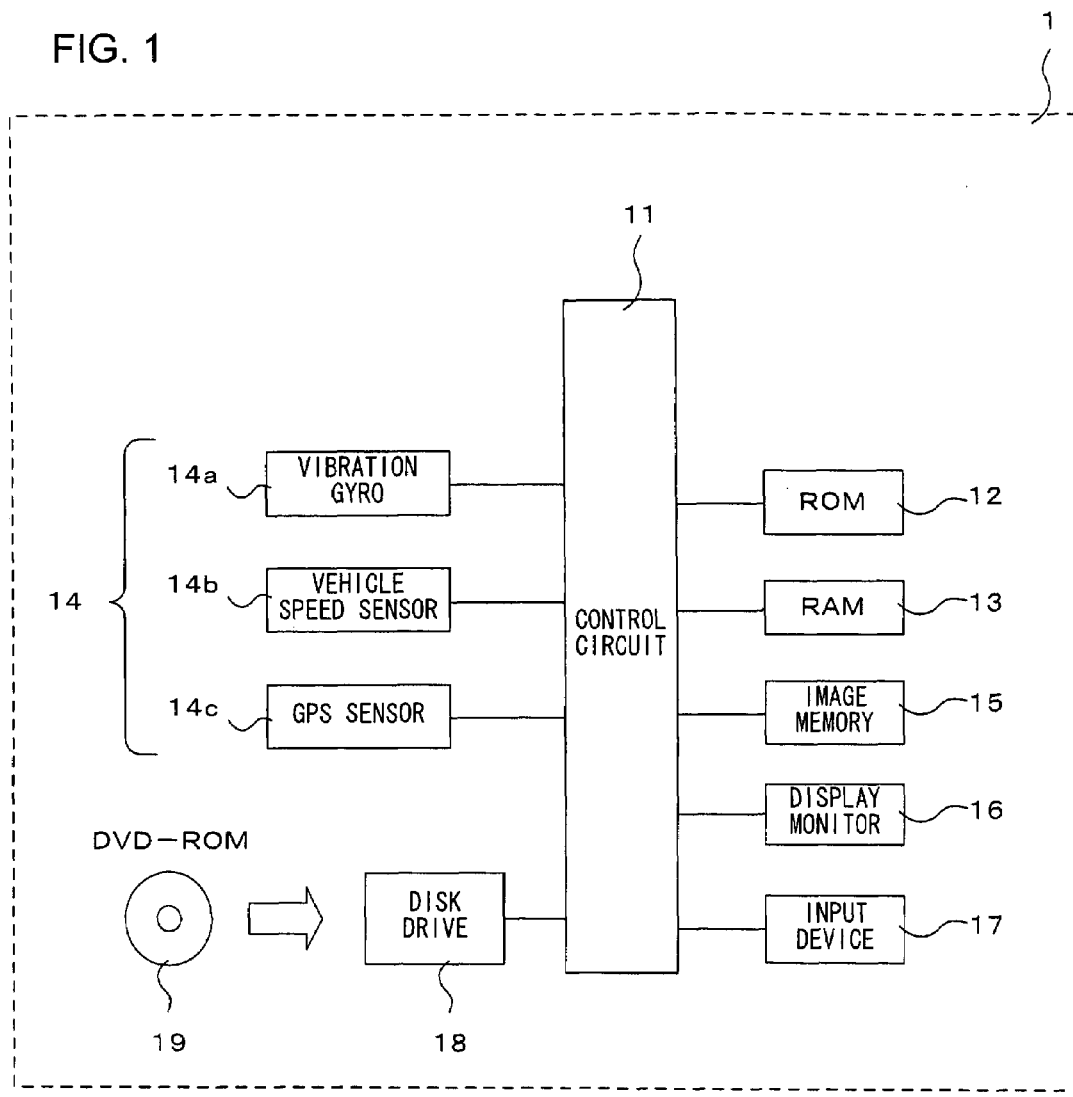
FIG. 1 is a block diagram showing the structure adopted in the navigation system achieved in an embodiment of the present invention.

FIG. 1 shows the structure adopted in the navigation system achieved in an embodiment of the present invention. The navigation system, which is installed in a vehicle, executes various types of processing in response to user operations. For instance, it is capable of searching for a destination candidate based upon a character having been input and searching for a recommended route to the destination. It is also capable of adjusting the map display contents in response to instructions for altering the scaling factor or the drawing method. By executing various types of processing as described above, the navigation system guides the subject vehicle to the destination. The navigation system 1 in FIG. 1 includes a control circuit 11, a ROM 12, a RAM 13, a current position detection device 14, an image memory 15, a display monitor 16, an input device 17 and a disk drive 18. A DVD-ROM 19 having recorded therein map data is loaded into the disk drive 18.

The control circuit 11 constituted with a microprocessor and its peripheral circuits uses the RAM 13 as its work area when executing a control program stored in the ROM 12 to implement various types of control processing. Based upon the map data recorded in the DVD-ROM 19, the various types of processing are executed as described above in the control circuit 11 in order to guide the subject vehicle to the destination.

The current position detection device 14, which detects the current position of the subject vehicle, may comprise, for instance, a vibration gyro 14*a* that detects the advancing direction of the subject vehicle, a vehicle speed sensor 14*b* that detects the vehicle speed, a GPS sensor 14*c* that detects a GPS signal transmitted from a GPS satellite and the like. Based upon the current position of the subject vehicle detected by the current position detection device 14, the navigation system 1 determines a route search start point to be detailed later, and displays the current position of the subject vehicle on the roadmap.

In the image memory 15, image data to be displayed at the display monitor 16 are temporarily stored. The image data include road map drawing data and various types of graphic data, which are generated in the control circuit 11 based upon the map data recorded in the DVD-ROM 19. The roadmap is displayed at the display monitor 16 by using the image data stored in the image memory 15.

The input device 17 includes various input switches that are operated by the user. The input device 17 may be constituted as an operation panel or a remote-control unit. By operating the input device 17 as prompted by screen instructions displayed at the display monitor 16, the user is able to engage the navigation system 1 in the execution of various types of processing as described above.

The disk drive 18 reads out map data to be used to display the roadmap from the DVD-ROM 19 loaded therein. These map data include route calculation data used to search for a route to a destination, route guidance data used to guide the subject vehicle to the destination along the recommended route, such as the names of intersections and roads, and road data indicating roads. In addition, the map data include background data indicating map features other than roads, such as rivers, railways and various types of facilities (landmarks) on the map. It is to be noted that facility information used to search for destination candidates, too, is stored as the map data.

The smallest unit that represents a road section in the road data is referred to as a link, and each road is constituted with a plurality of links. The point at which two or more links connect is referred to as a node, and each node holds positional information (coordinate information). Based upon the positional information corresponding to the individual nodes, the shapes of links, i.e., the shape of each road, are determined. It is to be noted that while the map data are stored in a DVD-ROM in the example described above, the map data may be read out from another type of recording medium such as a CD-ROM or a hard disk.

Once the user sets the destination by operating the input device 17, the navigation system 1 determines through an arithmetic operation the route to the destination by setting the current position detected by the current position detection device 14 as a route search start point and using a specific algorithm based upon the route calculation data. The recommended route thus determined is displayed on the roadmap by altering its display mode, e.g., by using a different display color, so as to ensure that it can easily be distinguished from the other roads. As a result, the user is able to check the route on the roadmap displayed at the display monitor 16. In addition, the navigation system 1 guides the subject vehicle along the route by providing visual or audio instructions for the user along the advancing direction. The route guidance to the destination is thus provided by guiding the subject vehicle to the destination along the recommended route in the roadmap on display.

When the user wishes to engage the navigation system 1 in a specific type of processing, the user presses a menu button to call up the menu screen and, in response, the operation shifts into a menu selection mode. Subsequently, the user operates the input device 17 to select a menu item corresponding to the desired processing in the selection menu displayed in the menu screen. The navigation system 1 then executes the processing corresponding to the selected menu item.

Since the selection menu is organized over a plurality of hierarchical levels in correspondence to processing contents, the user needs to select a specific menu item in each hierarchical level. For instance, if he wishes to set a destination by entering the name of a destination facility, he needs to first select "destination" in the menu screen and then select "input name". In response, a character entry screen is brought up on display and, as the user enters the name of the destination facility in this screen, matching facilities are searched as destination candidates. A specific facility selected from these destination candidates is finally set as the destination.

It is to be noted that a help mode in which the desired processing can be executed even when the user does not know the operation procedure is available in the navigation system 1. In the help mode, as the user enters a keyword related to the target processing, the operation procedure that needs to be performed to select the processing is indicated. The following is an explanation of the details of the operation executed in the navigation system 1 in the help mode.

Figure 2:
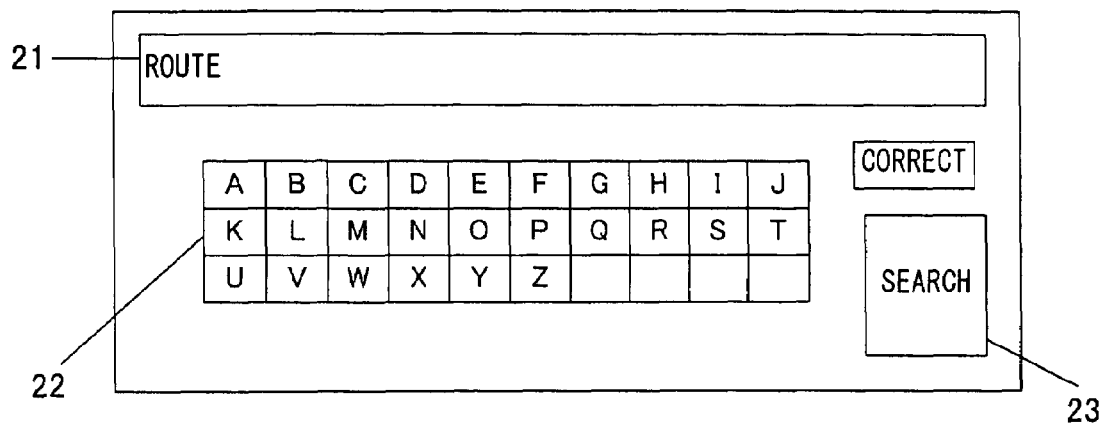
FIG. 2 presents an example of a keyword entry screen.

FIG. 2 shows the keyword entry screen which is first brought up on display first in the help mode. As the user sequentially selects specific characters among those displayed in a keyboard panel 22 in the keyword entry screen by operating the input device 17, a keyword related to the contents of the processing to be searched is entered. The user, wishing to search for processing regarding routes, enters the keyword "route", for instance. The entered keyword is displayed in an input display field 21 for user verification.

As the user presses a search button 23 upon completing the keyword entry, menu items related to the entered keyword are searched from the various menu items in the selection menu. If "route" has been entered as the keyword as described above, menu items related to "route", e.g., menu items containing the word "route", are searched. The search results are displayed in a list in a search result screen such as that shown in FIG. 3.

Figure 3:
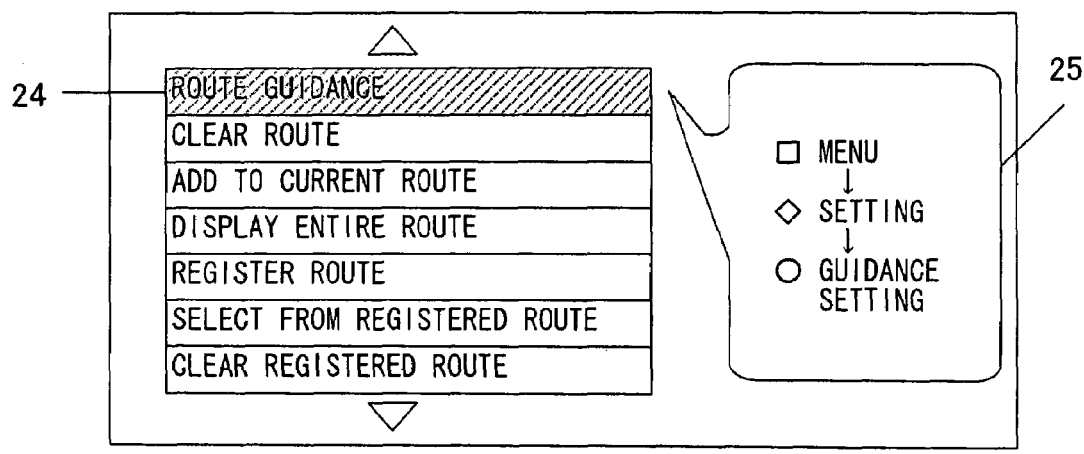
FIG. 3 presents an example of a search result screen.

In the search result screen in FIG. 3, one of the menu items in the list is highlighted and text information explaining the user operation procedure to be performed to select the particular menu item in the menu screen is provided. A highlight display can be switched from one menu item to another freely by the user via the input device 17. In the example presented in FIG. 3, a menu item "route guidance" indicated by reference numeral 24, among the various menu items in the list of menu items having been searched by using the word "route" as the search keyword, is highlighted. Inside a balloon display area 25, text information explaining the operation procedure to be performed to select the menu item "route guidance" is displayed. Namely, the search result screen in FIG. 3 indicates that the user is able to select "route guidance" by sequentially selecting "menu", "setting" and "guidance setting" in this order in the selection menu.

Figure 4:
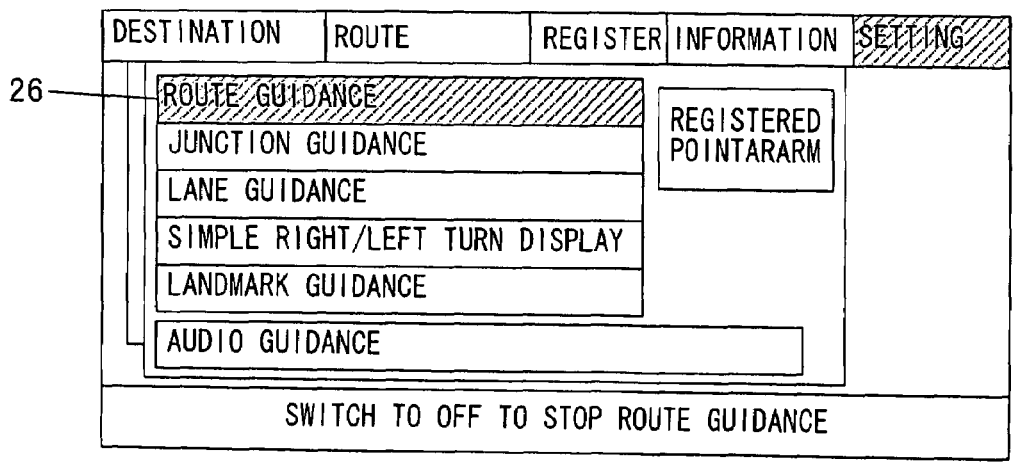
FIG. 4 presents an example of a screen that may be displayed after a menu item is selected in the search result screen.

As the user designates a specific menu item in the list in the search result screen in FIG. 3, the operation exits the help mode and the screen display jumps to a screen in which the particular menu item can be selected in the selection menu. For instance, if the user has designated the menu item "route guidance", a screen such as that shown in FIG. 4 may be brought up on display. The user selects "route guidance" indicated by reference numeral 26 in the screen shown in FIG. 4 to engage the navigation system 1 in route guidance processing. It is to be noted that when the screen display jumps to the screen shown in FIG. 4, the display contents corresponding to the various hierarchical levels in the selection menu are successively displayed in an order matching the operation procedure performed to select the menu item. This feature is to be explained in detail later.

It is to be noted that when the text information explaining the operation procedure is displayed in the search result screen in FIG. 3, the same information may also be provided as an audio output for the user to allow him to learn the operation procedure without having to view the screen. Alternatively, the operation procedure may be indicated through an audio output alone without displaying the text information.

Also, in the search result screen in FIG. 3, icons, each assigned as an inherent icon to one of the menu items in the selection menu may be displayed together with the explanation of the operation procedure, so as to allow the user to learn the operation procedure visually. For instance, a square icon, a diamond-shaped icon and a circular icon may be displayed next to "menu", "setting" and "guidance setting" respectively in the operation procedure explanation shown in FIG. 3. The same icons are also displayed in the selection menu in correspondence to the individual menu items. By displaying the icons each assigned to a specific menu item among the menu items that must be selected in the individual hierarchical levels in the selection menu until the menu item is ultimately selected as described above, the user is able to learn the operation procedure in correspondence to the icons. The term "icons" as referred to in this context are constituted with specific graphics, characters, symbols or the like, and their designs, each corresponding to a specific menu item, are different from one another.

Figure 5:
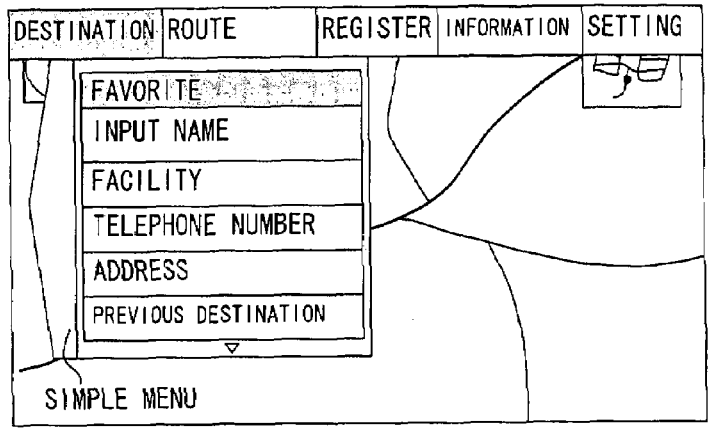
FIG. 5 presents a specific example of a screen that may be initially displayed when successively displaying the display contents corresponding to individual hierarchical levels in the selection menu in an order matching the operation procedure.
Figure 6:
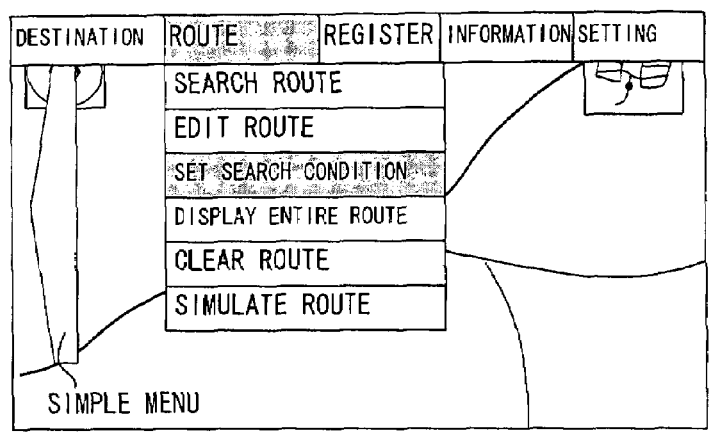
FIG. 6 presents a specific example of a screen that may be displayed after the screen in FIG. 5.
Figure 7:
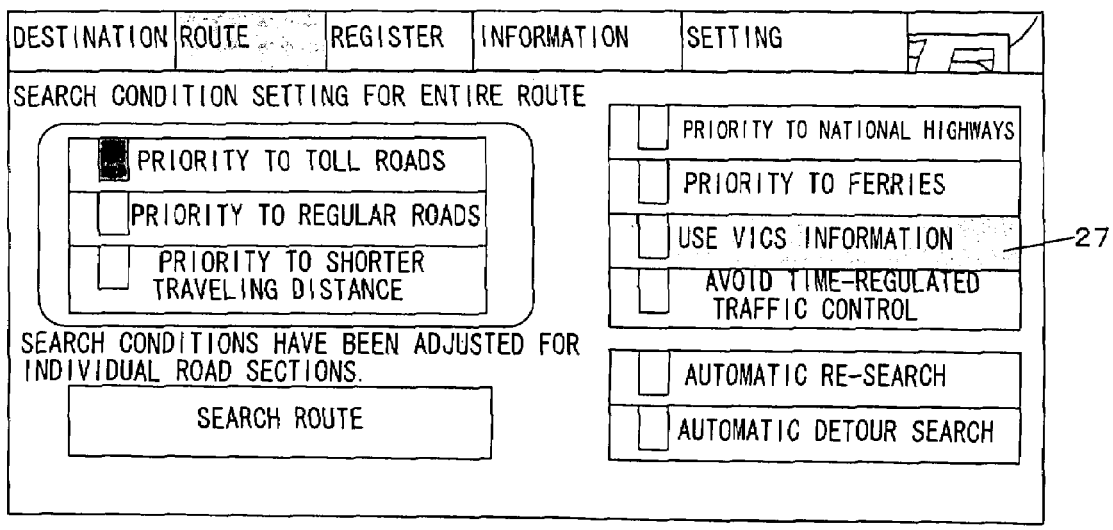
FIG. 7 presents a specific example of a screen that may be displayed after the screen in FIG. 6.

Next, a specific example of a successive display of the display contents corresponding to the individual hierarchical levels in the selection menu in an order matching the operation procedure for selecting the menu item, which is executed when the display jumps to the screen in which the menu item having been designated in the search result screen may be selected in the selection menu, is explained. For instance, let us assume that the menu item "use VICS information" is searched based upon a keyword entered by the user in the keyword entry screen in FIG. 2 and that this menu item is designated in the search result screen in FIG. 3. Under such circumstances, the screen shown in FIG. 5 is first brought up on display and then, the screens shown in FIGS. 6 and 7 are sequentially displayed. The display may switch from one screen to another over a predetermined time interval, e.g., after a one-second interval, or the display may switch to the next screen in response to a user operation. It is desirable to display contents in a manner closely simulating the screen changes resulting from the actual operation by, for instance, sequentially highlighting the menu items from top to bottom.

FIG. 5 shows the menu screen initially brought up on display when the menu button is pressed. FIG. 6 shows the screen brought up on display after "route" is selected in the menu screen in FIG. 5. FIG. 7 shows the screen brought up on display after "set search condition" is selected in the screen shown in FIG. 6. By selecting "use VICS information" indicated by reference numeral 27 in the screen shown in FIG. 7, the details of the search condition setting are adjusted so as to execute a route search by using VICS information. The user is informed of the operation procedure to be performed to select the menu item "use VICS information" as these screens are displayed in sequence.

Figure 8:
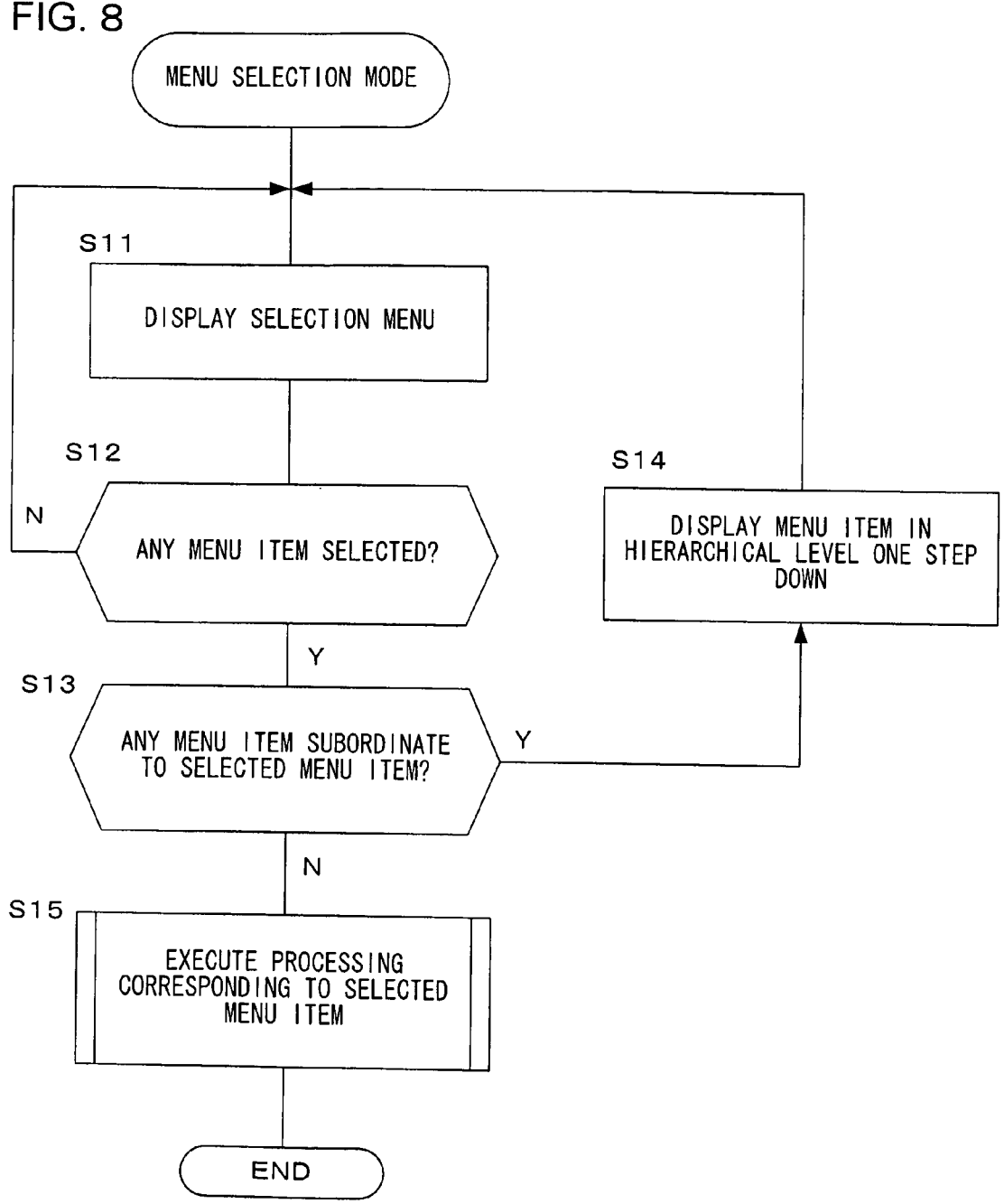
FIG. 8 presents a flowchart of the processing executed in a menu selection mode.
Figure 9:
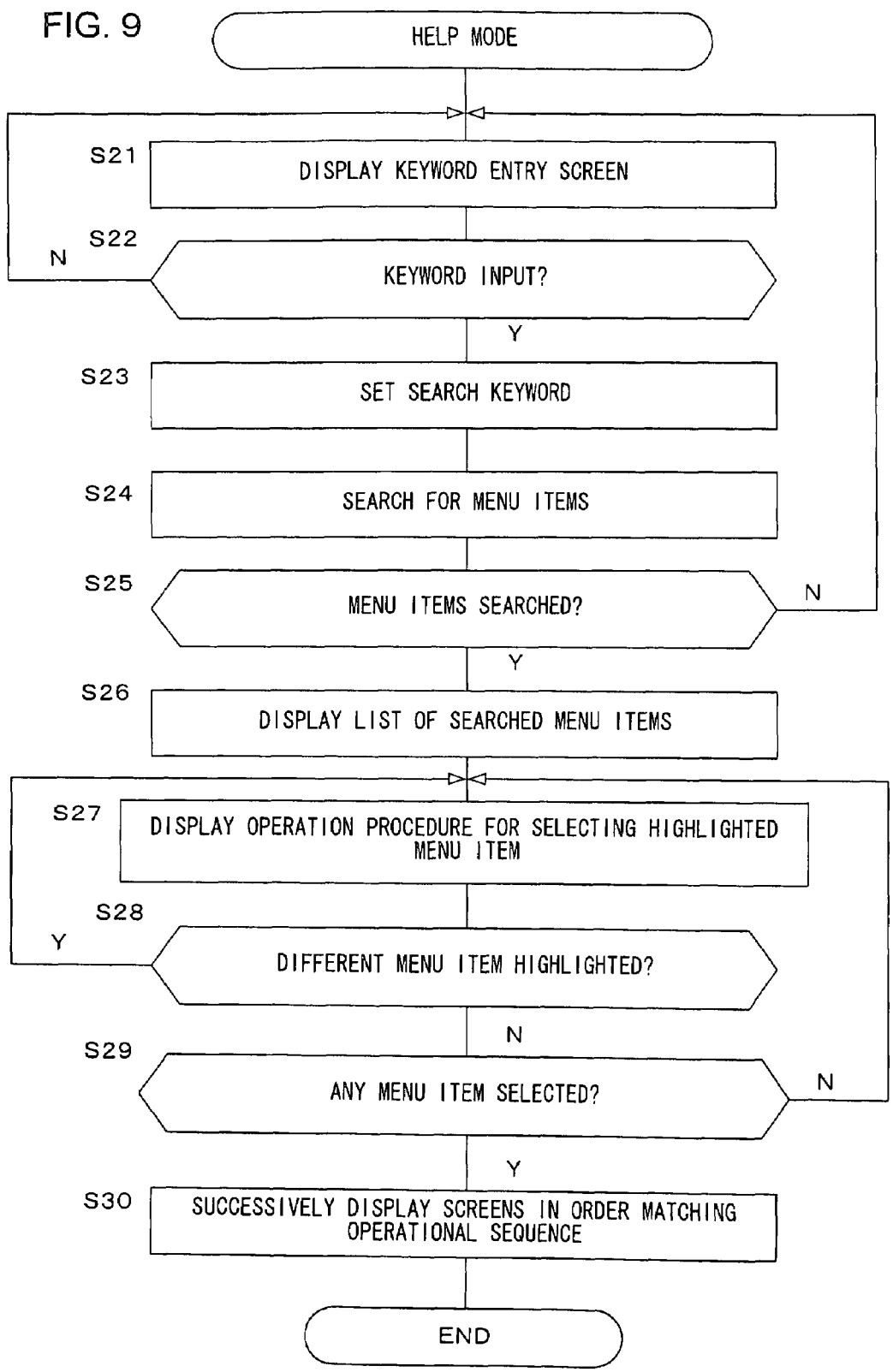
FIG. 9 presents a flowchart of the processing executed in a help mode in the first embodiment.

FIGS. 8 and 9 present flowcharts of the processing described above, which is executed by the control circuit 11. FIG. 8 presents a flowchart of the processing executed in the menu selection mode, whereas FIG. 9 presents a flowchart of the processing executed in the help mode. An explanation is given first on the processing corresponding to the flowchart in FIG. 8.

In step S11, the operation shifts into the menu selection mode and a menu screen such as that shown in FIG. 5 is brought up at the display monitor 16. The selection menu is thus brought up on display. In step S12, a decision is made as to whether or not the user has selected one of the menu items in the selection menu having been brought up on display in step S1. If it is decided that one of the menu items has been selected, the operation proceeds to the following step S13. If it is decided that no menu item has been selected, the operation returns to step S11 to continuously display the selection menu.

In step S13, a decision is made as to whether or not there are any menu items subordinate to the menu item having been selected in step S12. As explained earlier, the selection menu is organized over a plurality of hierarchical levels and accordingly, if the selected menu item is a menu item in the lowermost level, i.e., if the specific type of processing to be executed by the navigation system 1 is determined in correspondence to the selection of the particular menu item, it is decided that there are no menu items subordinate to the selected menu item. Otherwise, it is decided that there are menu items subordinate to the selected menu item. The operation proceeds to step S14 if it is decided that there are menu items subordinate to the selected menu item, but the operation proceeds to step S15 if it is decided that there are no menu items subordinate to the selected menu item.

In step S14, menu items in the hierarchical level one step lower than the hierarchical level of the menu item having been selected in step S12 are brought up on display at the display monitor 16. The contents of the menu items displayed at this time are determined based upon the results of the menu item selection in step S12 and in conformance to the predetermined hierarchical structure of the selection menu. For instance, if "destination" is selected, menu items in the hierarchical level one step lower than "destination", i.e., "favorite", "input name", "facility", "telephone number", "address" and "previous destination", are brought up on display. Once the processing in step S14 is executed, the operation returns to step S11 and after these menu items are brought up on display in step S11 as the next selection menu, the processing described above is repeated. By repeatedly executing the processing in steps S12 through S14 as described above, a specific menu item in each hierarchical level in the selection menu is selected in response to a user operation.

In step S15, the processing corresponding to the menu item having been determined in step S12 as an ultimate selection is executed. For instance, if the menu item "use VICS information" has been selected in step S12, the setting of search condition is adjusted so as to execute a route search by using the VICS information. It is to be noted that since the subsequent processing can be executed by adopting any of various methods of the known part in correspondence to the processing contents, a specific processing method is not explained. Once the processing in step S15 is executed, the processing in the flowchart presented in FIG. 8 ends. The menu selection mode processing is executed through the flow described above.

Next, the processing executed in the help mode as shown in the flowchart in FIG. 9 is explained. In step S21, the keyword entry screen in FIG. 2 is brought up on display at the display monitor 16. In the following step S22, a decision is made as to whether or not any keyword has been entered through a user operation in the keyword entry screen having been brought up on display in step S21. If the user has pressed down on the search button 23, it is judged that the keyword entry has been completed and, in this case, the operation proceeds to step S23. If, on the other hand, the search button 23 has not been pressed, it is judged that the keyword entry has not been completed yet and the operation returns to step S21 to continue the keyword entry screen display.

In step S23, a search keyword to be used to search for menu items is set based upon the keyword having been entered in step S22. In step S24, menu items related to the search keyword are searched based upon the search keyword having been set in step S23. In step S25, a decision is made as to whether or not at least one menu item related to the search keyword has been searched in step S24. If it is decided that at least one menu item has been searched, the operation proceeds to step S26. Otherwise, i.e., if no menu item has been searched, the operation returns to step S21 to prompt the user to reenter a keyword.

In step S26, the menu items having been searched in step S25 are displayed in a list at the display monitor 16. It is to be noted that one of the menu items in the list on display is highlighted. Thus, a search result screen such as that shown in FIG. 3 is brought up on display at the display monitor 16. In the following step S27, the operation procedure for selecting the highlighted menu item among the menu items in the list having been brought up on display in step S26 is displayed at the display monitor 16 in the form of text information in the balloon display area 25 in FIG. 3. As a result, the user is informed of the operation procedure for selecting the highlighted menu item in the selection menu.

In step S28, a decision is made as to whether or not a different menu item in the list displayed on the screen is now highlighted in response to a user operation. If the highlight display has been switched, the operation returns to step S27 to display the operation procedure for selecting the newly highlighted menu item at the display monitor 16. If, on the other hand, it is decided that the initial menu item is still highlighted, the operation proceeds to the next step S29.

In step S29, a decision is made as to whether or not one of the menu items in the list on display has been selected. For instance, if an OK button included in the input device 17 has been pressed down by the user, it is decided that the highlighted menu item has been selected and the operation proceeds to step S30. If, on the other hand, no menu item has been selected, the operation returns to step S27 to repeatedly execute the processing described above. The selected menu item in step S29 is designated in the following processing.

In step S30, the display contents corresponding to the individual hierarchical levels in the selection menu are successively displayed at the display monitor 16 in an order matching the operation procedure for selecting in the selection menu the menu item having been designated by selecting in the list in step S29, as explained earlier in reference to FIGS. 5 through 7. Through the processing executed in step S30, the user is informed of the operation procedure for selecting the menu item in the selection menu. Once the processing in step S30 is executed, the processing in the flowchart presented in FIG. 9 ends. The help mode processing is executed through the flow explained above.

The following advantages are achieved in the embodiment described above.

(1) In the menu selection mode, the selection menu organized over a plurality of hierarchical levels is displayed as a menu screen at the display monitor 16 (step S11) and by selecting a specific menu item in each hierarchical level in the selection menu in response to a user operation (steps S12 through S14), a specific type of processing corresponding to the menu item that is ultimately selected is executed (step S15). In the help mode, a search keyword is set based upon a user input operation (step S23) and menu items related to the search keyword are searched from the various menu items in the selection menu (step S24). Then, the user operation procedure for selecting a specific searched menu item in the selection menu is indicated in step S27 and in step S30. As a result, if the user does not know the operation procedure for the execution of the specific type of processing, the user is given an opportunity to learn the correct operation procedure.

(2) In step S30, the display contents corresponding to the individual hierarchical levels in the selection menu are successively displayed at the display monitor 16 in an order matching the operation procedure for selecting the menu item having been selected in step S29 in the selection menu. The user, informed of the operation procedure for selecting the particular menu item, is able to learn the operation procedure in a visual and user-friendly format.

(3) In step S27, text information explaining the operation procedure for selecting the highlighted menu item among the menu items in the list having been brought up on display in step S26 is displayed at the display monitor 16. Thus, the operation procedure for selecting the specific menu item can be indicated to the user through simple processing.

(4) In addition, in step S27, icons assigned to the individual menu items each selected in a specific hierarchical level in the selection menu until the final menu item is selected are displayed at the display monitor 16 in an order matching the operation procedure, together with the text information explaining the operation procedure. As a result, the operation procedure is indicated to the user in a user-friendly format by using icons each corresponding to a given menu item.

(5) It is to be noted that when displaying the text information explaining the operation procedure in step S27, the same contents may also be provided as audio information. In such a case, the user is able to learn the operation procedure without having to view the screen.

Second Embodiment

The second embodiment, with features distinguishing it from the first embodiment explained above, is now described. In the first embodiment, the display contents corresponding to the individual hierarchical levels in the selection menu are successively displayed as shown in FIGS. 5 through 7 in the help mode. By doing this, the operation procedure for selecting the menu item in the selection menu that has been designated in the help mode is indicated to the user. In the second embodiment, the display contents corresponding to the individual hierarchical levels in the selection menu are displayed within a single screen to indicate to the user the operation procedure for selecting in the selection menu the menu item designated in the help mode. The second embodiment is now explained in more specific terms.

Figure 10:
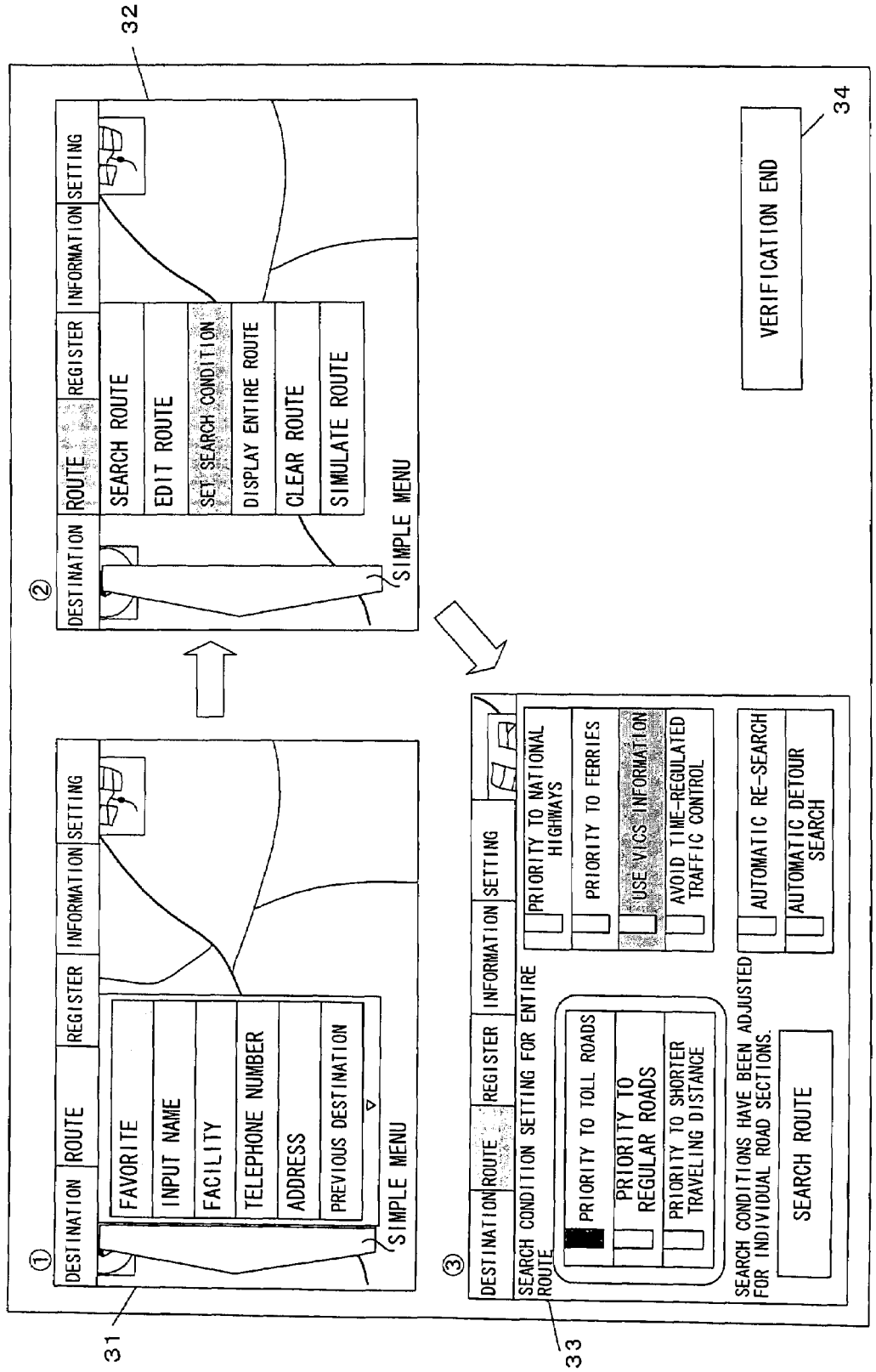
FIG. 10 presents a specific example of a screen that may be brought up when displaying the display contents corresponding to the individual hierarchical levels in the selection menu in an order matching the operation procedure within a single screen.

FIG. 10 presents an example of a screen displayed at the display monitor 16 in the second embodiment as an alternative to the screens in FIGS. 5 through 7 when the display jumps to the screen in which the menu item having been designated in the search screen in FIG. 3 can be selected in the selection menu. In the screen, the contents of FIG. 5 are displayed in a reduced size over the area indicated by reference numeral 31. Likewise, the contents of FIG. 6 are displayed in reduced size over the area indicated by reference numeral 32, and the contents of FIG. 7 are displayed in reduced size over the area indicated by reference numeral 33. In other words, the contents of FIGS. 5 through 7 sequentially displayed to indicate how the menu items can be selected in the selection menu are displayed within a single screen page in a reduced size.

If one of the display areas indicated by reference numerals 31 through 33 in the screen in FIG. 10 is selected by the user, the selected area is displayed in an enlargement in a single screen. Namely, if the area indicated by reference numeral 31 is selected, the screen shown in FIG. 5 is brought up on display. Likewise, if the area indicated by reference numeral 32 is selected, the screen shown in FIG. 6 is brought up on display and if the area indicated by reference numeral 33 is selected, the screen shown in FIG. 7 is brought up on display.

After one of the display areas is displayed in an enlargement as described above, subsequent screens are successively displayed in an order matching the operation procedure, as in the first embodiment. Namely, after the area indicated by, for instance, reference numeral 31 is selected and the screen in FIG. 5 is brought up on display, the screens in FIGS. 6 and 7 are successively displayed. If the area indicated by reference 32 is selected and the screen in FIG. 6 is brought up on display, the screen in FIG. 7 is displayed next. It is to be noted that the display may be switched from one screen to another at this time over a predetermined time interval or in response to a user operation, as has been explained in reference to the first embodiment. After the screen in FIG. 7 is brought up on display, the display jumps to the screen in FIG. 4, as in the first embodiment.

Reference numeral 34 in FIG. 10 indicates a verification end button. As the user selects the verification end button 34, the display jumps directly from the screen in FIG. 10 to the screen in FIG. 4, without providing successive display of the screens in FIGS. 5 through 7. It is to be noted that the display may jump to the screen in FIG. 4 when a predetermined length of time, e.g., 10 seconds, elapses, long enough to allow the user to verify the contents of the screen in FIG. 10, instead of in response to the user operation of the verification end button.

Figure 11:
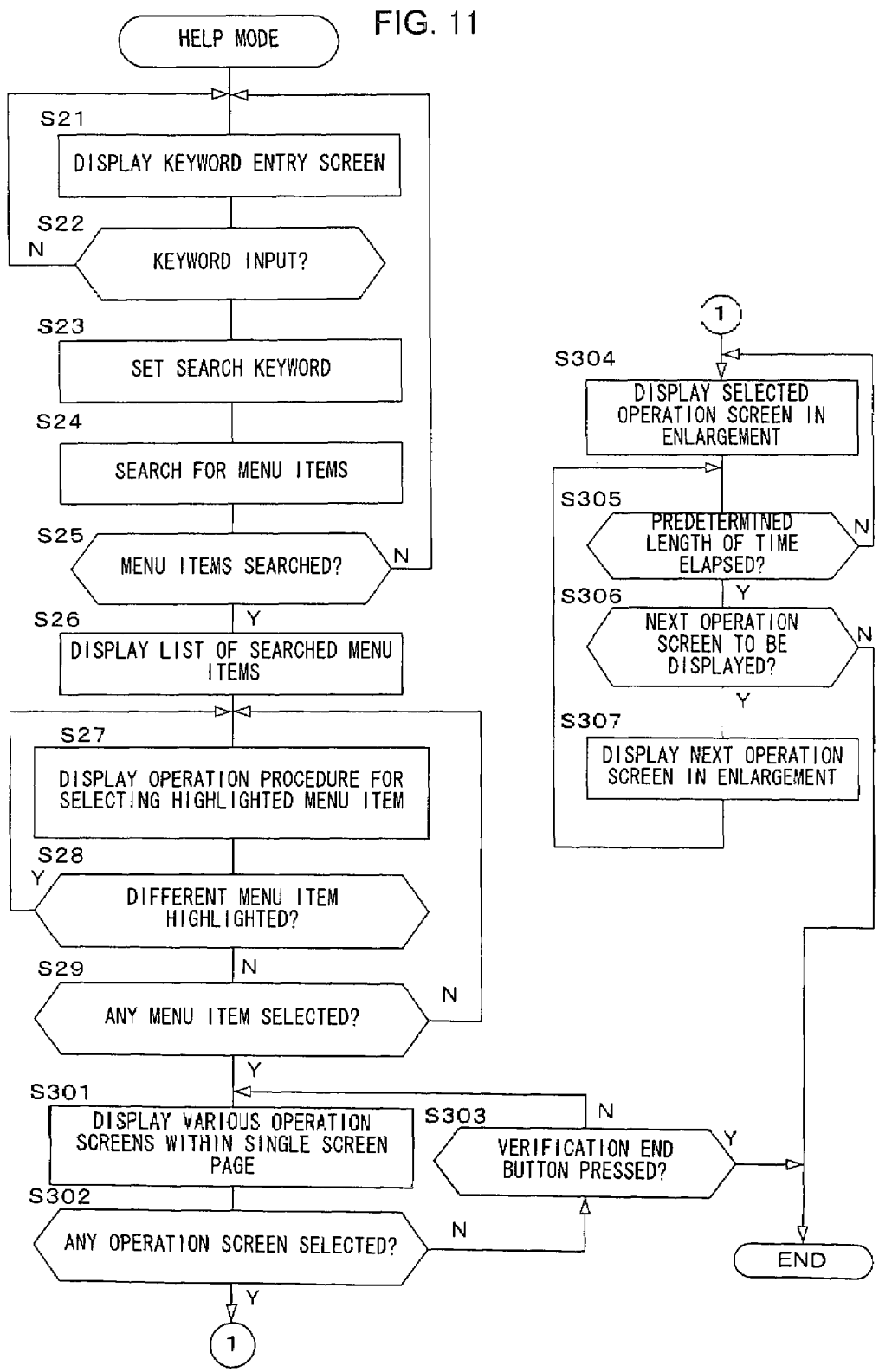
FIG. 11 presents a flowchart of the processing executed in the help mode in a second embodiment.

FIG. 11 presents a flowchart of the processing executed in the help mode in the second embodiment. It is to be noted that the same step numbers as those in FIG. 9 presenting the flowchart of the processing executed in the first embodiment are assigned to processing steps in the flowchart presented in FIG. 11 in which processing with identical contents is executed. A repeated explanation of the processing steps assigned with the same step numbers as those in FIG. 9 is not provided.

In step S301, the screen in FIG. 10 is brought up on display at the display monitor 16. By doing this, the display contents corresponding to the individual hierarchical levels in the selection menu, i.e., the individual operation screens, are displayed in a single screen in an order matching the operation procedure for selecting in the selection menu the menu item having been designated in step S29. In the following step S302, a decision is made as to whether or not any of the operation screens having been brought up on display in step S301, i.e., any of the areas indicated by reference numerals 31, 32 and 33 in FIG. 10, has been selected by the user. If any of the screen areas has been selected, the operation proceeds to step S304.

If, on the other hand, it is decided in step S302 that none of the operation screens have been selected by the user, the operation proceeds to step S303. In step S303, a decision is made as to whether or not the verification end button 34 in FIG. 10 has been pressed via a user operation. If the verification end button has been pressed, the processing in the flowchart in FIG. 10 ends, thereby exiting the help mode. If, on the other hand, the verification end button has not been pressed, the operation returns to step S301 to hold the display of the screen shown in FIG. 10. It is to be noted that a decision as to whether or not a predetermined length of time has elapsed may be made in step S303 instead as explained earlier. In this case, if the predetermined length of time has not elapsed, the operation returns to step S301, whereas if the predetermined length of time has elapsed, the processing in the flowchart presented in FIG. 10 ends.

In step S304, the operation screen having been selected by the user in step S302 is displayed in an enlargement. In other words, one of the screens in FIGS. 5, 6 and 7 is brought up on display. In step S305, a decision is made as to whether or not the operation screen having been brought up in an enlargement in step S304 has been on display over a predetermined length of time. The predetermined length of time is set in advance as the time interval over which the screens are switched, as explained earlier. If it is decided that the predetermined length of time has elapsed since the enlarged screen came up on display, the operation proceeds to step S306, whereas if it is decided that the predetermined length of time has not elapsed, the operation returns to step S304. It is to be noted that a decision as to whether or not a screen switching operation has been performed by the user may be made in step S305 instead, as explained earlier. In such a case, the operation proceeds to step S306 if a screen switching operation has been performed, but the operation returns to step S304 if no such operation has been performed.

In step S306, a decision is made as to whether or not there is a subsequent operation screen to follow the operation screen currently on display. It is to be noted that the operation screen currently on display is the enlarged operation screen having been brought up in the immediately preceding step S304 or S307. If it is decided that there is a subsequent operation screen, the operation proceeds to step S307 to bring up an enlarged display of the screen before the operation returns to step S305. If there is no subsequent operation screen to display, the processing in the flowchart in FIG. 10 ends, thereby exiting the help mode.

To explain the processing executed in step S306 and S307 in more specific terms, if the screen shown in FIG. 5 or FIG. 6 is currently on display, an affirmative decision is made in step S306. In this case, the screen in FIG. 6 or FIG. 7 is brought up on display in step S307. If, on the other hand, the screen shown in FIG. 7 is currently on display, a negative decision is made in step S306. In this case, the processing in the flowchart shown in FIG. 10 ends, thereby exiting the help mode.

In the second embodiment described above, display contents corresponding to the individual hierarchical levels in the selection menu are displayed within a single screen at the display monitor 16 in step S301 in an order matching the operation procedure for selecting in the selection menu the menu item having been designated in step S29. The user, informed of the operation procedure for selecting the menu item as described above, is able to learn the operation procedure in a visual and user-friendly format, as in the first embodiment.

It is to be noted that while an explanation is given in reference to the second embodiment on an example in which three operation screens are displayed within a single screen in a reduced size, as shown in FIG. 10, the number of screens to be displayed within a single screen is not limited to this example. Depending upon the operation procedure for selecting the specific menu item in the selection menu, any number of screens can be set to be displayed within a single screen page. In addition, instead of bringing up a single screen page, as shown in FIG. 10, a plurality of screen pages may be displayed successively.

In the embodiments described above, the various units constituting the present invention are achieved through the processing executed by the control circuit 11. More specifically, the menu display control unit is realized through the processing executed in step S11, the selection unit is achieved through the processing executed in steps S12 through S14, the processing execution unit is achieved through the processing executed in step S15, the keyword setting unit is achieved through the processing executed in step S23, the search unit is achieved through the processing executed in step S24 and the informing unit is achieved through the processing executed in step S27 or step S30. However, the present invention is not limited to the embodiments described above and any other modes conceivable within the scope of the teaching of the present invention should be regarded to be within the scope of the present invention.

Figure 12:
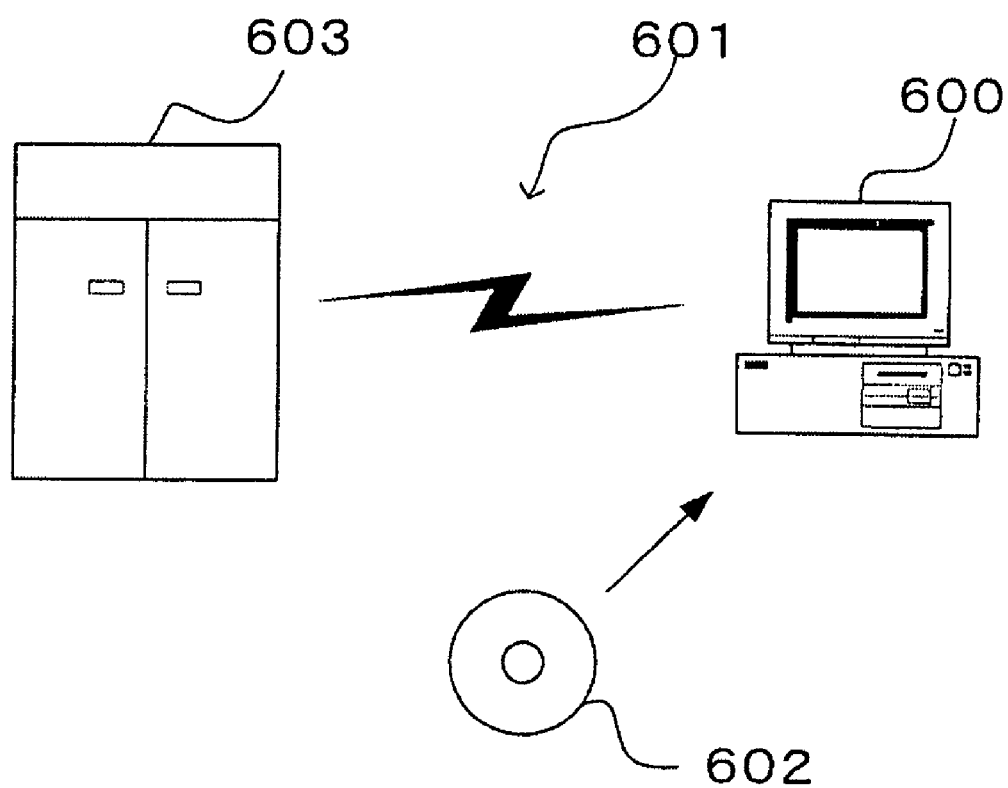
FIG. 12 shows how the present invention may be adopted in a personal computer.

It is to be noted that the present invention may be adopted in a personal computer or the like by providing a program related to the control described above in a recording medium such as a CD-ROM or through an electrical communication network such as the Internet. FIG. 12 shows a configuration that may be adopted in such applications. A personal computer 600 receives the program via a CD-ROM 602. The personal computer 600 also has a function of achieving a connection with a communication line 601 to receive the program provided by a server 603. The communication line 601 may be a communication network for Internet communication or personal computer communication, or it may be a dedicated communication line. The server 603 transmits the program to the personal computer 600 via the communication line 601. In other words, the program, converted to a data signal on a carrier wave, is transmitted via the communication line 601. Thus, the program can be distributed as a computer-readable computer program product adopting any of various modes including a recording medium and a carrier wave.

While the invention has been particularly shown and described with respect to preferred embodiments thereof by referring to the attached drawings, the present invention is not limited to these examples and it will be understood by those skilled in the art that various changes in form and detail may be made therein without departing from the spirit, scope and teaching of the invention.

What is claimed is:

1. An on-vehicle information terminal capable of executing various types of processing, comprising:
    a menu display control unit that displays at a display monitor a selection menu that includes a plurality of menu items organized over a plurality of hierarchical levels;
    a selection unit that selects in response to a user operation a specific menu item in each hierarchical level in the selection menu displayed at the display monitor by the menu display control unit;
    a processing execution unit that executes processing corresponding to a menu item, which is ultimately selected by the selection unit;
    a keyword setting unit that sets a search keyword based upon an input operation performed by a user;
    a search unit that searches the plurality of menu items for all of the hierarchy levels of the selection menu to generate a search result containing one or more menu items of the selection menu related to the search keyword set by the keyword setting unit and that receives an input that identifies a menu item of the one or more menu items of the search result; and
    an informing unit that informs the user of an operation procedure to be performed to select the identified menu item in the search result using the selection menu in response to receiving the input that identifies the menu item, the operating procedure including a menu item in each hierarchical level of the selection menu required to ultimately select the identified menu item of the selection result using the selection menu and an order of the menu items to ultimately select the identified menu item.

2. An on-vehicle information terminal according to claim 1, wherein:
    the informing unit informs the user of the operation procedure by successively displaying display contents corresponding to the individual hierarchical levels in the selection menu at the display monitor in an order matching the order of menu items in the operation procedure.

3. An on-vehicle information terminal according to claim 1, wherein:
    the informing unit informs the user of the operation procedure by displaying at the display monitor text information explaining the operation procedure.

4. An on-vehicle information terminal according to claim 1, wherein:
    the informing unit informs the user of the operation procedure by outputting audio information explaining the operation procedure.

5. An on-vehicle information terminal according to claim 1, wherein:
    the menu display control unit controls the display monitor to display icons constituted with, at least, graphics, characters or symbols and each assuming an unique appearance corresponding to a specific menu item in the selection menu; and
    the informing unit informs the user of the operation procedure by displaying at the display monitor icons corresponding to individual menu items that must be selected in various hierarchical levels using the selection menu to ultimately select the identified menu item in an order matching the order of menu items in the operation procedure.

6. An on-vehicle information terminal according to claim 1, wherein:
    the informing unit informs the user of the operation procedure by displaying within a single screen at the display monitor display contents corresponding to the individual hierarchical levels in the selection menu for selecting the identified search menu item in an order required for selecting the identified menu using the selection menu.

7. A navigation system comprising:
    an on-vehicle information terminal according to claim 1; and
    a current position detection device that detects a current position of subject vehicle.

8. The on-vehicle information terminal according to claim 1, wherein:
    the search result generated by the search unit includes one or more menu items of the plurality of menu items of the selection menu of that include the search keyword set by the keyword setting unit.

9. An on-vehicle information terminal control method for controlling an on-vehicle information terminal capable of executing various types of processing, comprising:
    displaying a selection menu that includes a plurality of menu items organized over a plurality of hierarchical levels at a display monitor;
    selecting a specific menu item in each hierarchical level in the selection menu in response to a user operation;
    executing processing corresponding to a menu item that is ultimately selected;
    setting a search keyword based upon an input operation performed by a user;
    searching the plurality of menu items to identify a menu item related to the search keyword having been set from among the plurality of menu items in the selection menu; and
    indicating an operation procedure to the user to be performed to select the identified menu item, wherein the operating procedure includes one or more menu items each in a hierarchical level, and an order for selecting the one or more menu items to ultimately select the identified menu item.

10. An on-vehicle information terminal control method according to claim 9, wherein:
the operation procedure is indicated to the user by successively displaying display contents corresponding to the individual hierarchical levels in the selection menu at the display monitor in an order matching the operation procedure.

11. An on-vehicle information terminal control method according to claim 9, wherein:
the operation procedure is indicated to the user by displaying at the display monitor text information explaining the operation procedure.

12. An on-vehicle information terminal control method according to claim 9, wherein:
the operation procedure is indicated to the user by outputting audio information explaining the operation procedure.

13. An on-vehicle information terminal control method according to claim 9, wherein:
the display monitor is controlled to display icons constituted with, at least, graphics, characters or symbols and each assuming an unique appearance corresponding to a specific menu item in the selection menu; and
the operation procedure is indicated to the user by displaying at the display monitor icons corresponding to individual menu items that must be selected in various hierarchical levels until the searched menu item is ultimately selected, in an order matching the operation procedure.

14. An on-vehicle information terminal control method according to claim 9, wherein:
the operation procedure is indicated to the user by displaying within a single screen at the display monitor display contents corresponding to the individual hierarchical levels in the selection menu in an order matching the operation procedure.

15. A program product having a computer readable medium storing computer instructions which when executed cause the computer to perform a method comprising;
a step for displaying at a display monitor a selection menu that includes a plurality of menu items organized over a plurality of hierarchical levels;
a step for selecting a specific menu item in each hierarchical level in the selection menu in response to a user operation;
a step for executing processing corresponding to a menu item that is ultimately selected using the selection menu;
a step for setting a search keyword based upon an input operation by a user;
a step for searching the plurality of menu items to identify a menu item related to the search keyword having been set; and
a step for informing the user of an operation procedure to be performed to select the identified menu item using the selection menu.

16. A program product according to claim 15, wherein:
in the step for informing the user of the operation procedure, the computer is controlled so as to successively display at the display monitor display contents corresponding to the individual hierarchical levels in the selection menu in an order matching the operation procedure.

17. A program product according to claim 15, wherein:
in the step for informing the user of the operation procedure, the computer is controlled so as to display at the display monitor text information explaining the operation procedure.

18. A program product according to claim 15, wherein:
in the step for informing the user of the operation procedure, the computer is controlled so as to output audio information explaining the operation procedure.

19. A program product according to claim 15, wherein:
in the step for displaying the selection menu at the display monitor, the computer is controlled so as to display icons constituted with, at least, graphics, characters or symbols and each assuming an unique appearance corresponding to a specific menu item in the selection menu; and
in the step for informing the user of the operation procedure, the computer is controlled so as to display at the display monitor icons corresponding to individual menu items that must be selected in individual hierarchical levels until the identified menu item is ultimately selected, in an order matching the operation procedure.

20. A program product according to claim 15, wherein:
in the step for informing the user of the operation procedure, the computer is controlled so as to display within a single screen at the display monitor display contents corresponding to the individual hierarchical levels in the selection menu in an order matching the operation procedure.

* * * * *

UNITED STATES PATENT AND TRADEMARK OFFICE
CERTIFICATE OF CORRECTION

PATENT NO. : 7,580,793 B2 Page 1 of 1
APPLICATION NO. : 11/391181
DATED : August 25, 2009
INVENTOR(S) : Junko Oguchi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 652 days.

Signed and Sealed this

Fourteenth Day of September, 2010

David J. Kappos
*Director of the United States Patent and Trademark Office*